(12) United States Patent
Zheng et al.

(10) Patent No.: US 9,162,201 B2
(45) Date of Patent: Oct. 20, 2015

(54) HYDROGEN GENERATOR HAVING LIQUID DELIVERY MEMBER

(75) Inventors: Guanghong Zheng, Westlake, OH (US); Russell H. Toye, Jr., Avon, OH (US)

(73) Assignee: Intelligent Energy, Inc., San Jose, CA (US)

( * ) Notice: Subject to any disclaimer, the term of this patent is extended or adjusted under 35 U.S.C. 154(b) by 645 days.

(21) Appl. No.: 13/584,927

(22) Filed: Aug. 14, 2012

(65) Prior Publication Data

US 2014/0050625 A1    Feb. 20, 2014

(51) Int. Cl.
*C01B 3/08* (2006.01)
*B01J 7/02* (2006.01)
*B01J 4/00* (2006.01)

(52) U.S. Cl.
CPC ... *B01J 7/02* (2013.01); *B01J 4/004* (2013.01)

(58) Field of Classification Search
CPC combination set(s) only.
See application file for complete search history.

(56) References Cited

U.S. PATENT DOCUMENTS

| 7,410,567 | B2 | 8/2008 | Lefenfeld et al. | |
|---|---|---|---|---|
| 7,481,858 | B2 | 1/2009 | Rosenzweig et al. | |
| 7,896,934 | B2 | 3/2011 | Curello et al. | |
| 2004/0023087 | A1* | 2/2004 | Redmond | 429/19 |
| 2006/0002839 | A1 | 1/2006 | Lefenfeld et al. | |
| 2006/0191199 | A1* | 8/2006 | Rosenzweig et al. | 48/61 |
| 2009/0101520 | A1 | 4/2009 | Zhang et al. | |
| 2009/0104481 | A1 | 4/2009 | Mohring et al. | |
| 2011/0070151 | A1 | 3/2011 | Braithwaite et al. | |
| 2011/0194992 | A1* | 8/2011 | Barton et al. | 422/239 |
| 2012/0100443 | A1* | 4/2012 | Braithwaite et al. | 429/411 |
| 2012/0269694 | A1* | 10/2012 | Zheng et al. | 422/187 |
| 2013/0028809 | A1* | 1/2013 | Barton et al. | 422/187 |

* cited by examiner

*Primary Examiner* — Kaity Handal
(74) *Attorney, Agent, or Firm* — Baker Hostetler LLP; Mark H. Krietzman

(57) ABSTRACT

A hydrogen generator is provided for generating hydrogen gas for a fuel cell stack. The hydrogen generator includes container, and a first reactant storage area configured to contain a liquid first reactant. The hydrogen generator also includes a reaction area and a solid second reactant within the reaction area, and a hydrogen outlet. The hydrogen generator further includes a flexible liquid delivery member extending into the reaction area and configured to deliver liquid reactant from the first reactant storage area to the reaction area. The flexible liquid delivery member includes a flexible portion that flexes to allow the delivery member to move with the solid second reactant as the second reactant is consumed.

14 Claims, 7 Drawing Sheets

HYDROGEN GENERATOR HAVING LIQUID DELIVERY MEMBER

FIELD OF THE INVENTION

This invention relates to a hydrogen generator, particularly a hydrogen generator for a fuel cell system, and a liquid delivery member for delivering liquid reactant to the hydrogen generator.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the positive electrode side of the fuel cell, and hydrogen is produced from the supplied fuel. In other types of hydrogen fuel cells, hydrogen gas is supplied to the fuel cell from a source outside the fuel cell. A fuel cell system can include a fuel cell battery, including one or more fuel cells, and a hydrogen source, such as a hydrogen tank or a hydrogen generator. In some fuel cell systems, the hydrogen source can be replaced after the hydrogen is depleted. Replaceable hydrogen sources can be rechargeable or disposable.

A hydrogen generator uses one or more reactants containing hydrogen that can react to produce hydrogen gas. The reaction can be initiated in various ways, such as hydrolysis and thermolysis. For example, two reactants can produce hydrogen and byproducts when mixed together. A catalyst can be used to catalyze the reaction. When the reactants react, reaction products including hydrogen gas and byproducts are produced.

For a hydrolysis reaction, the hydrogen generator can employ a liquid containing a first reactant that mixes with a second reactant within a reaction area in a container. A liquid delivery nozzle or dispersing member can be employed to transport the liquid from a storage area to the reaction area. The liquid delivery nozzle can include a tube having one or more openings through which a liquid passes into the reaction area to mix with the second reactant. The reaction causes the generation of hydrogen gas which exits the hydrogen generator and may be provided as fuel to a fuel cell battery.

It is desirable to provide an effective and efficient distribution of the liquid reactant transferred to the reaction area to react with the second reactant in a manner that efficiently utilizes the reactants.

SUMMARY

The above advantages are provided by a hydrogen generator and liquid deliver member for delivering a liquid containing a first reactant to a hydrogen generator according to the present invention.

A first aspect of the present invention is a hydrogen generator. The hydrogen generator includes a container and a first reactant storage area configured to contain a liquid including a first reactant. The hydrogen generator also includes a reaction area within the container, a solid including a second reactant within the reaction area, and a hydrogen outlet. The hydrogen generator further includes a liquid delivery member extending into the reaction area and configured to deliver the liquid from the first reactant storage area to the reaction area. The liquid delivery member includes a liquid distribution portion and a flexible portion, more flexible than the liquid distribution portion, that flexes to allow the liquid distribution portion to move with the solid as the second reactant is consumed.

Embodiments of the first aspect of the invention can include one or more of the following features:

the liquid delivery member extends from an exhaust nozzle that is in communication with the hydrogen outlet;

the liquid delivery member has the flexible portion between opposite ends thereof;

the liquid delivery member includes a first tube delivery portion coupled to a liquid inlet port, a second liquid distribution portion, and a U-shaped connector connecting the first and second portions, wherein at least one of the first portion and the U-shaped connector is flexible;

the liquid delivery member includes a plurality of openings for delivering the liquid reactant to the reaction area;

the solid includes a pellet containing the second reactant;

the first reactant storage area is located in the container; and the second reactant is contained in the reaction area within a flexible enclosure bag, wherein the liquid delivery member extends through an opening in the flexible enclosure.

A second aspect of the present invention is a liquid delivery member for delivering a liquid containing a first reactant to a hydrogen generator. The liquid delivery member includes an inlet for receiving a liquid containing a first reactant and an outlet for delivering the liquid to a solid containing a second reactant within a reaction area. The delivery member also includes a flexible portion, more flexible than the outlet, provided between the inlet and outlet. The flexible portion flexes such that the outlet can move with the solid as the second reactant is consumed.

Embodiments of the second aspect of the invention can include one or more of the following features:

the liquid delivery member extends from an exhaust nozzle that is in communication with a hydrogen outlet that allows hydrogen to exit the hydrogen generator;

the liquid delivery member includes a liquid distribution portion between the inlet and the outlet, wherein the flexible portion is provided between the liquid distribution portion and the inlet;

the liquid delivery member includes a first tube delivery portion configured to be coupled to a liquid inlet port, a second liquid distribution portion, and a U-shaped connector connecting the first and second portions, wherein at least one of the first portion and the U-shaped connector is the flexible portion;

the outlet includes a plurality of openings for delivering the liquid to the second reactant;

the solid containing the second reactant comprises a pellet;

the inlet receives liquid from a first reactant storage area located within a container of the hydrogen generator; and the liquid delivery member is located within a flexible enclosure, and wherein the second reactant is contained in the reaction area within the flexible enclosure, and wherein the liquid delivery member extends through an opening in the flexible enclosure.

These and other features, advantages and objects of the present invention will be further understood and appreciated by those skilled in the art by reference to the following specification, claims and appended drawings.

Unless otherwise specified, the following definitions and methods are used herein:

"effluent" means non-gaseous reaction products and unreacted reactants, solvents and additives;

"expand" when used in describing a filter means for the filter material to simultaneously increase in volume, increase in porosity and decrease in density and pertains only to the material of which the filter is made;

"initial" means the condition of a hydrogen generator in an unused or fresh (e.g., refilled) state, before initiating a reaction to generate hydrogen;

"volume exchanging relationship" means a relationship between two or more areas or containers within a hydrogen generator such that a quantity of volume lost by one or more of the areas or containers is simultaneously gained by one or more of the other areas or containers; the volume thus exchanged is not necessarily the same physical space, so volume lost in one place can be gained in another place; and "flexible" means sufficiently pliable to bend and change shape due to gravitational force or forces applied by components of the hydrogen generator under normal use conditions.

Unless otherwise specified herein, all disclosed characteristics and ranges are as determined at room temperature (20-25° C.).

DETAILED DESCRIPTION

Figure 1:
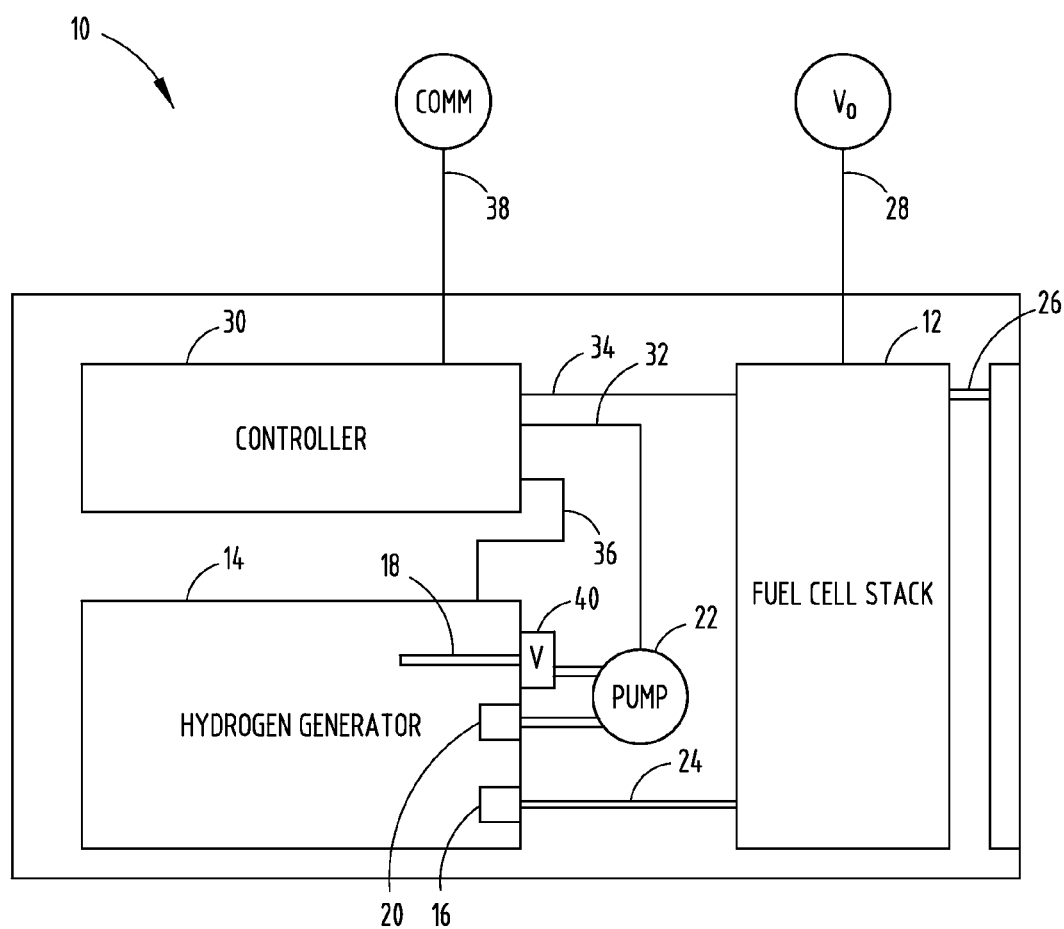
FIG. 1 is a schematic diagram of a fuel cell system including a hydrogen generator employing a liquid delivery member for delivering liquid reactant, according to one embodiment.

The present invention includes a separate hydrogen gas generator that can be incorporated into a fuel cell system including a fuel cell battery, but it is not part of the fuel cell itself. It is typically a removable, replaceable or refillable unit that can supply hydrogen to a fuel cell, rather than supplying a liquid or other fluid that is reformed by or within the fuel cell to produce hydrogen gas or protons.

The fuel cell with which the hydrogen generator can be used can be a battery containing a single fuel cell, or it can be a battery containing a plurality of fuel cells (sometimes referred to as a fuel cell stack). The fuel cell can be any type of fuel cell that uses hydrogen as a fuel. Examples include proton exchange membrane fuel cells, alkaline fuel cells and solid oxide fuel cells.

In one embodiment, a hydrogen generator includes a container with one or more reactant storage areas, a reaction area and an effluent storage area within the container. One or more reactant-containing liquids, each containing one or more reactants, are transferred from the reactant storage area or areas to the reaction area, where the reactant or reactants react to produce hydrogen gas and byproducts. One or more reactants can also be initially contained within the reaction area. The reaction can be catalyzed by a catalyst, which can be initially in the reaction area or contained in a fluid transferred to the reaction area. The byproducts can include gaseous, liquid and solid reaction products. The production of hydrogen gas can force effluent from the reaction area, through an effluent passage, to the effluent storage area. The effluent can include reaction byproducts as well as unreacted reactants and additives.

The reactant-containing liquid includes a first reactant, which can be the liquid (e.g., water), or the reactant can be mixed, suspended, dissolved or otherwise contained in the liquid. After the liquid is transported from the reactant storage area to the reaction area, it reacts with a second reactant to produce hydrogen gas. In one embodiment, one reactant is contained in the reaction area, preferably in a solid form as one or more pellets, and the reactant-containing liquid is transported from the reactant storage area to the reaction area, where the reactants react to produce hydrogen gas; the reaction may be catalyzed by a catalyst in the reaction area.

The reactant storage, reaction, and effluent storage areas may be arranged in a volume exchanging configuration such that, as reactants are consumed during operation of the hydrogen generator, the effluent storage area simultaneously increases in volume by moving into space made available by a reduction in volume of the areas initially containing reactant to accommodate the effluent within the effluent storage area. In this way the total volume of the hydrogen generator can be minimized, since the amount of initial void volume within the hydrogen generator can be kept at a minimum (though some initial void volume may be necessary, if the solid and liquid reaction products have a greater volume than the initial total volume of the reactants for example). Any suitable volume exchanging configuration can be used. For example, one or more areas containing reactant (e.g., a reactant storage area and/or a reaction area containing a reactant) can be adjacent to the effluent storage area, or the effluent storage area can be separated from the areas containing reactant by one or more other components of the hydrogen generator that can move or otherwise allow the volume exchange.

Hydrogen gas is separated from the liquid and solid effluent and is released through a hydrogen outlet to an apparatus such as a fuel cell as needed. A filter and a hydrogen permeable, liquid impermeable component can be used to separate the hydrogen. The filter removes solids and may remove liquids as well, and the hydrogen permeable, liquid impermeable component removes liquids and any remaining solids, allowing only gas to pass through the hydrogen outlet. Optionally, other components may be included within or downstream from the hydrogen generator to remove other gases and impurities from the hydrogen flow.

Any or all of the reactant storage area(s), the reaction area, and the effluent storage area can be defined by one or more of the internal surfaces of the container and other components of the hydrogen generator, or one or more of these areas can be enclosed by an enclosure, such as a reactant storage enclosure, a reaction area enclosure or an effluent storage area enclosure. Such enclosures are able to undergo a change in shape (e.g., by being flexible) so their internal volume can decrease or increase as material exits or enters the enclosure. An enclosure can include a structure such as a bag, a balloon or a bellows, for example. The walls of an enclosure can be pleated or made from an elastomeric material that can stretch or contract, for example, to enable a change in internal volume. In one embodiment, an enclosure can have a wall or a portion of a wall that can stretch to provide a larger internal volume and can apply a force to the contents to facilitate emptying the contents.

In one embodiment, the effluent storage area is enclosed by an enclosure. One or more filter components can be fastened to the enclosure in one or more places to minimize the amount of effluent that can flow around the filter component. The enclosure can be or can include a hydrogen permeable, liquid impermeable material to separate hydrogen gas from liquids in the effluent storage area.

A liquid including a reactant can be transported from the reactant storage area by any suitable means. For example, the liquid can be wicked, pumped, expelled by applying a force on the liquid, or a combination thereof. If the liquid is pumped, the pump can be within or outside the hydrogen generator. The pump can be powered by a fuel cell, a battery within the hydrogen generator, or an external power source. A force can be applied directly against a reactant storage area enclosure, against a moveable partition in contact with either enclosure, or against one or more other components that make contact with or are a part of the enclosure (such as a valve assembly) for example. Force can be provided in various ways, such as with a spring, an elastic reactant storage enclosure that is initially stretched when full, wrapping the reactant storage enclosure with an elastic member, air or gas pressure on or within the reactant storage enclosure, the expansion of the filter in the effluent storage area, or a combination thereof.

The hydrogen generator includes a liquid delivery member that extends into the reaction area and is configured to deliver the liquid from the first reactant storage area to the reaction area. The liquid delivery member includes a liquid distribution portion through which the liquid including the first reactant can pass. In various embodiments the liquid distribution portion can include holes or slits through which the liquid can exit, or it can be made from a material through which the liquid can permeate or wick. These properties limit the selection of types of materials that can be used. Often suitable materials have limited flexibility and are not able to conform well to the changing surface of the solid containing the second reactant (which is also referred to as "the solid" herein) as the second reactant is consumed. This can lead to non-uniform distribution of the liquid to the second reactant, non-uniform and incomplete utilization of the solid containing the second reactant, and a tendency for pieces of the solid to break away and be flushed out of the reaction area. For these reasons, the liquid delivery member also includes a flexible portion that flexes to allow the liquid distribution portion to move and thereby stay in communication with the solid as the second reactant is consumed. The flexible portion is more flexible than, and is disposed upstream from, the liquid distribution portion. The flow path of the reactant-containing liquid to and within the reaction area can include one or more liquid passages that can include various components such as tubes, wicks connections, valves, etc. Within the reaction area, the liquid is delivered and dispersed by the liquid delivery member. The liquid delivery member can include one or more structures extending into or within the reaction area. The structures can be tubular or can have other shapes. The flexible portion of the liquid delivery member is flexible to allow the liquid distribution portion move as the solid and/or the reaction area change shape during operation of the hydrogen generator. In one embodiment, the liquid distribution portion can include a tube with holes or slits which form openings therein through which the liquid can exit. In another embodiment the liquid distribution portion can include a porous material through which the liquid can permeate. In another embodiment the liquid distribution portion can include a material through which the liquid can wick. In yet another embodiment a sleeve of wicking material is provided around the liquid distribution member. This can keep solid reaction byproducts from forming on the liquid distribution member and clogging the holes, slits, pores, etc., and preventing the flow of liquid.

The liquid delivery member may be integrally assembled to an exhaust nozzle which has an opening for allowing hydrogen gas and effluent byproduct to exit the reaction area. The liquid delivery member may include a first portion in the shape of a tube that extends through or is otherwise assembled to the exhaust nozzle. The liquid delivery member may include a first, flexible portion in the shape of a tube having ripples or undulations that allow the tube to easily bend to allow a second, liquid distribution portion having a plurality of openings to move (e.g., due to gravity and/or pressure applied by the reaction area enclosure) and remain on a surface to better conform to the surface of the solid as the second reactant is consumed and the solid thereby shrinks. The second portion may likewise be formed in the shape of a tube that may be cylindrical or somewhat flattened or any other feasible shape. In an embodiment, the liquid distribution portion may be made of plastic material or non-wettable fibers that are liquid impermeable. The liquid exits the liquid distribution portion at each of the plurality of openings. A wicking member such as a sponge like material may further be provided at the second portion in fluid communication with the openings to wick the liquid to the underlying solid reactant. The general shape of the delivery member may be linear, bent or any desired shaped suitable to apply sufficient liquid to the adjacent solid.

The liquid delivery member may be assembled separate from the exhaust nozzle according to anther embodiment. In this case, the liquid delivery member may include a flexible portion extending into the reaction area on the side opposite the side of the exhaust nozzle. A liquid distribution portion having a plurality of openings can be coupled to the flexible portion and extend towards the exhaust nozzle. The openings may be sized and oriented to transport a greater amount of liquid on the side opposite the exhaust nozzle or may evenly distribute the liquid.

The liquid delivery member may be configured with an outlet that wraps back towards the inlet. In this embodiment, the liquid delivery member may include a first portion in fluid communication with a liquid inlet assembled to the exhaust nozzle, a second liquid distribution portion having a plurality of openings for outputting the liquid, and an intermediate U-shaped connector connecting the first portion and the second portion. The second portion can extend substantially parallel to the first portion such that the U-shaped connector forms a 180 degree connection. The first portion, the U-shaped connector or both the first portion and the U-shaped connector may be a flexible portion that is sufficiently flexible so as to allow the second portion to move with and remain on top of the solid as it is consumed and shrinks. The flexible portion bends sufficiently (e.g., due to gravity and/or pressure applied by the reaction area enclosure) to allow the second portion to reposition and remain close to the adjacent surface of the partially consumed solid. The flexible portion may move inward and/or rotate about the longitudinal axis of the first portion so the liquid distribution portion can move toward the adjacent surface of the solid as the solid is consumed.

The hydrogen generator may be configured to include the hydrogen gas exhaust tube and filter components arranged on top of the second reactant storage enclosure such that effluent solids and water settle down towards the bottom. As such, reaction byproducts of reactant, such as sodium borohydride will tend to settle down on the bottom of the cartridge due to gravity and thereby reduce the risk of blocking the fluid flow path of the hydrogen gas exhaust tube which may be made of expanded polytetrafluoroethylene, according to one embodiment. In the case in which the hydrogen generator can be used upside down, the hydrogen exhaust tube may be placed on both top and bottom sides of the cartridge such that one piece of the hydrogen exhaust tube is always positioned on top of the second reactant storage enclosure when the cartridge is positioned flat. To make the hydrogen generator orientation independent, the filter(s) and hydrogen exhaust tube may be located on all six surfaces of the cartridge.

A baffle bag (i.e., a bag containing one or more baffles) could further be included in the hydrogen generator to force hydrogen and effluent byproduct to exit and flow through the filter before exiting the hydrogen generator cartridge. The baffle bag could be located on the end of the reaction area opposite the exhaust nozzle and may include a large bag that contains the reaction area enclosure and the liquid reactant storage enclosure, both of which may be bags. An opening may be formed in the baffle bag at a location away from the exhaust nozzle such as at the end opposite the exhaust nozzle. Hydrogen and reaction byproduct may exit from the reaction area enclosure from one end and flow across the cartridge to the opposite end and exit from the top of the baffle bag to the tubing. The baffle bag may be closed on both ends or may be open on one or both ends.

The liquid delivery member may be configured in various shapes and sizes to achieve a desired liquid to solid reactant contact time and area. The liquid to solid reactant contact surface may be increased by increasing the overall length or the width of the liquid distribution member. The length may be increased by using a non-linear tube such as a wrap around design or shaping the tube with undulations or multiple tubes.

The liquid distribution portion of the liquid delivery member may be provided with openings having various configurations. In one embodiment, the openings may be spaced closer together towards the end of the solid reactant opposite the exhaust nozzle and/or the size of the openings may increase as the distance from the exhaust nozzle increases. The liquid delivery member design may take into account the liquid re-distribution along the solid surface after liquid is delivered. This may include unevenly spacing the openings in the liquid distribution portion. Fewer openings may be formed near the end towards the exhaust nozzle than the opposite end so that un-reacted first reactant carried by the hydrogen stream could be further reacted when hydrogen travels along the length of the solid towards the exhaust nozzle. The opening size may be varied along the length of the liquid distribution portion. The opening size close to the exhaust nozzle may be smaller than the opening size on the opposite end. The openings may be formed on one side of the tube and the debris and burrs should be removed. As such, a uniform solid reactant consumption and lower liquid to solid reactant ratio may be achieved.

The hydrogen generator can use hydrolysis of a hydride and water at a low pH to generate the hydrogen gas and may be operated intermittently by stopping and starting the reaction which may result in the formation of an insulating crust of hydrated product that may tend to reduce the efficiency of the remaining fuel upon restarting of the reaction. The crust may block off water access to the remaining hydride and hinder the start up after periodic use. To dissolve and break through the crust of basic reaction product, acid may be injected, e.g., in a high concentration, upon restarting of the reaction. Thus, acid can be injected into the water stream that enters the fuel cell cartridge after a sufficient long period of shutdown to dissolve and breakup the crust and allow for the more efficient reaction of the hydride products. The acid may be applied through the same fluid path used to apply reactant-containing liquid or a separate fluid injection path. The acid may be stored within the hydrogen generator in a separate compartment and utilizing the same pump used to supply the liquid to the reaction area.

According to another embodiment, ultrasonic or other sound waves may be applied to the hydride to break the crust of reaction product to thereby enable water to access the second reactant for sufficient start up and generation of hydrogen. The hydrogen generator may utilize a speaker that generates sound waves after a sufficiently long period of non-use and/or whenever a new or partially used hydrogen cartridge is placed in the system. The speaker and associated control circuitry can be placed in the hydrogen generator or could be placed within the electronic device being powered such that it does not add to the cost or complexity to the fuel cartridge. The control circuitry may apply sound waves to the hydrogen generator when needed based on software and/or triggered by insertion or reinsertion of the hydrogen generator in a fuel cell system. The frequency of the sound waves may be tailored to the effectiveness of breaking up the crust. According to one embodiment, supersonic frequencies may be employed. By employing audible sound waves, the audible sound may serve as a feature to let the user know that the hydrogen generator was reinserted and was working properly. In one embodiment, the sound waves may be at a resonant frequency of a hydrogen generator reactant mixer. The resonant frequency may be varied and found for the hydrogen generator or may be estimated by a manufacturer beforehand. The frequency may also be selected as a function of the state of charge of the hydrogen generator which is used to estimate the weight of the reactants.

The generation of hydrogen gas can be controlled so hydrogen is produced as needed. Control can be based on one or more criteria, such as: pressure (e.g., internal pressure or a differential between an internal and an external pressure); temperature (e.g., hydrogen generator, fuel cell or device temperature); a fuel cell electrical condition (e.g., voltage, current or power); or a device criterion (e.g., internal battery condition, power input, or operating mode).

The hydrogen generator system can use a variety of reactants that can react to produce hydrogen gas. Examples include chemical hydrides, alkali metal silicides, metal/silica gels, water, alcohols, dilute acids and organic fuels (e.g., N-ethylcarbazole and perhydrofluorene). At least one reactant is included in the liquid stored in the reactant storage area. The liquid can be a reactant or can contain a reactant (e.g., dissolved, dispersed or suspended therein).

As used herein, the term "chemical hydride" is broadly intended to be any hydride capable of reacting with a liquid to produce hydrogen. Examples of chemical hydrides that are suitable for use in the hydrogen generator described herein include, but are not limited to, hydrides of elements of Groups 1-4 (International Union of Pure and Applied Chemistry (IUPAC) designation) of the Periodic Table and mixtures thereof, such as alkaline or alkali metal hydrides, or mixtures thereof. Specific examples of chemical hydrides include lithium hydride, lithium aluminum hydride, lithium borohydride, sodium hydride, sodium borohydride, potassium hydride, potassium borohydride, magnesium hydride, calcium hydride, and salts and/or derivatives thereof. In an embodiment, a chemical hydride such as sodium borohydride can react with water to produce hydrogen gas and a byproduct such as a borate. This can be in the presence of a catalyst, heat, a dilute acid or a combination thereof.

Chemical hydrides can react with water to produce hydrogen gas and oxides, hydroxides and/or hydrates as byproducts. The hydrolysis reaction may require a catalyst or some other means of initiation, such as a pH adjustment or heating. Chemical hydrides that are soluble in water can be included in the liquid reactant composition, particularly at alkaline pH to make the liquid sufficiently stable. The reaction can be initiated by contacting the chemical hydride solution with a catalyst, lowering the pH (e.g., with an acid), and/or heating. Chemical hydrides can be stored as a solid, and water can be added. A catalyst or acid can be included in the solid or liquid composition.

An alkali metal silicide is the product of mixing an alkali metal with silicon in an inert atmosphere and heating the resulting mixture to a temperature of below about 475° C., wherein the alkali metal silicide composition does not react with dry $O_2$. Such alkali metal silicides are described in US Patent Publication 2006/0002839. While any alkali metal, including sodium, potassium, cesium and rubidium may be used, it is preferred that the alkali metal used in the alkali metal silicide composition be either sodium or potassium. Metal silicides including a Group 2 metal (beryllium, magnesium, calcium, strontium, barium and radium) may also be suitable. In an embodiment, sodium silicide can react with water to produce hydrogen gas and sodium silicate, which is soluble in water.

A metal/silica gel includes a Group 1 metal/silica gel composition. The composition has one or more Group 1 metals or alloys absorbed into the silica gel pores. The Group 1 metals include sodium, potassium, rubidium, cesium and alloys of two or more Group 1 metals. The Group 1 metal/silica gel composition does not react with dry $O_2$. Such Group 1 metal/silica gel compositions are described in U.S. Pat. No. 7,410,567 B2 and can react rapidly with water to produce hydrogen gas. A Group 2 metal/silica gel composition, including one or more of the Group 2 metals (beryllium, magnesium, calcium, strontium, barium and radium) may also be suitable.

One or more catalysts can be used to catalyze the hydrogen producing reactions. Examples of suitable catalysts include transition metals from Groups 8 to 12 of the Periodic Table of the Elements, as well as other transition metals including scandium, titanium, vanadium, chromium and manganese. Metal salts, such as chlorides, oxides, nitrates and acetates can also be suitable catalysts.

The rate of hydrogen generation can be controlled in a variety of ways, such as controlling of the rate at which liquid is transported to the reaction area, adjusting the pH, and making temperature adjustments. The rate of hydrogen generation can be controlled to match the need for hydrogen gas. A control system can be used for this purpose, and the control system can be within or at least partially outside the hydrogen generator.

Additives can be used for various purposes. For example, additives can be included with a solid reactant as a binder to hold the solid material in a desired shape or as a lubricant to facilitate the process of forming the desired shape. Other additives can be included in the liquid or the solid composition to control pH, to provide stability during storage and periods of nonuse, and to control the rate of reaction for example. Such additives include but are not limited to acids (e.g., hydrochloric, nitric, acetic, sulfuric, citric, carbonic, malic, phosphoric and acetic acids or combinations thereof), or basic compounds. Additives such as alcohols and polyethylene glycol based compounds can be used to prevent freezing of the liquid. Additives such as surfactants or wetting agents can be used to control the liquid surface tension and reaction product viscosity to facilitate the flow of hydrogen gas and/or effluents. Additives such as porous fibers (e.g., polyvinyl alcohol and rayon) can help maintain the porosity of a solid reactant component and facilitate even distribution of the reactant containing liquid and/or the flow of hydrogen and effluents.

In one embodiment, water is a first reactant and a chemical hydride such as sodium borohydride (SBH) is a second reactant. The SBH can be stored as a solid in the reaction area. It can be present as a powder or formed into a desired shape. If an increased rate of reaction between the SBH and the water is desired, a solid acid, such as malic acid, can be mixed with the solid SBH, or acid can be added to the water. Solid (e.g. powdered) SBH can be formed into a solid mass, such as a block, tablet or pellet, to reduce the amount of unreacted SBH contained in the effluent that exits the reaction area. As used below, "pellet" refers to a mass of any suitable shape or size into which a solid reactant and other optional ingredients are formed. The pellet should be shaped so that it will provide a large contact surface area between the solid and liquid reactants.

In an example, a mixture including about 50 to 65 weight percent SBH, about 30 to 40 weight percent malic acid and about 1 to 5 weight percent polyethylene glycol can be pressed into a pellet. Optionally, up to about 3 weight percent surfactant (anti-foaming agent), up to about 3 weight percent silica (anti-caking agent) and/or up to about 3 weight percent powder processing rheology aids can be included in a pellet. The density of the pellet can be adjusted, depending in part on the desired volume of hydrogen and the maximum rate at which hydrogen is to be produced. A high density is desired to produce a large amount of hydrogen from a given volume. On the other hand, if the pellet is too porous, unreacted SBH can more easily break away and be flushed from the reaction area as part of the effluent. One or more pellets of this solid reactant composition can be used in the hydrogen generator, depending on the desired volume of hydrogen to be produced by the hydrogen generator. The ratio of water to SBH in the hydrogen generator can be varied, based in part on the desired amount of hydrogen and the desired rate of hydrogen production. If the ratio is too low, the SBH utilization can be too low, and if the ratio is too high, the amount of hydrogen produced can be too low because there is insufficient volume available in the hydrogen generator for the amount of SBH that is needed. In another example, a liquid including water is moved from the reactant storage area to the reaction area to react with solid sodium borohydride (SBH). The liquid includes an acid such as malic acid to provide a low pH to produce hydrogen gas at a desirable rate.

The hydrogen generator can include other components, such as control system components for controlling the rate of hydrogen generation (e.g., pressure and temperature monitoring components, valves, timers, etc.), safety components such as pressure relief vents, thermal management components, electronic components, and so on. Some components used in the operation of the hydrogen generator can be located externally rather than being part of the hydrogen generator itself, making more space available within the hydrogen generator and reducing the cost by allowing the same components to be reused even though the hydrogen generator is replaced.

The hydrogen generator can be disposable or refillable. For a refillable hydrogen generator, reactant filling ports can be included in the housing, or fresh reactants can be loaded by opening the housing and replacing containers of reactants. If an external pump is used to pump fluid reactant composition from the reaction storage area to the reactant area, an external connection that functions as a fluid reactant composition outlet to the pump can also be used to refill the hydrogen generator with fresh liquid reactant composition. Filling ports can also be advantageous when assembling a new hydrogen generator, whether it is disposable or refillable. If the hydrogen generator is disposable, it can be advantageous to dispose of components with life expectancies greater than that of the hydrogen generator externally, such as in the fuel cell system or an electrical appliance, especially when those components are expensive.

The reactant storage area, reaction area, and effluent storage area can be arranged in many different ways, as long as effluent storage area is in a volume exchanging relationship with one or more of the reactant storage and reaction areas that will allow the initially compressed filter to expand as the effluent storage area increases in volume. Other considerations in selecting an arrangement include thermal management (adequate heat for the desired reaction rate and dissipation of heat generated by the reactions), the desired locations of external connections (e.g., for hydrogen gas, liquid reactant flow to and from an external pump), any necessary electrical connections (e.g., for pressure and temperature monitoring and control of liquid flow rate), and ease of assembly.

Referring to FIG. 1, a fuel cell system 10 is illustrated containing a hydrogen generator 14, according to one embodiment. Fuel cell system 10 includes a fuel cell stack 12 and a removable hydrogen generator 14 for providing hydrogen gas fuel to the fuel cell stack 12. The hydrogen passes through an outlet valve 16 in the hydrogen generator 14, and through an inlet 24 to the fuel cell stack 12, where it is used as a fuel by the anode. Another gas, such as oxygen, enters the fuel cell stack 12 through an inlet 26, where it is used as oxidant by the cathode. The fuel cell stack 12 produces electricity shown as voltage $V_O$ that is provided to an electric device through a power output 28. Reactants within the hydrogen generator 14 react to produce the hydrogen. A liquid in the hydrogen generator 14 is transferred from a reactant storage area to a reaction area where the hydrogen is generated. The liquid is transferred by a pump 22, which can be disposed within or outside the housing of hydrogen generator 14. If the pump 22 is within the housing of the hydrogen generator 14, fewer external connections are needed, but if the pump 22 is an external pump, it can continue to be used after the used hydrogen generator 14 is replaced. In the embodiment shown, the pump 22 is shown outside the hydrogen generator 14. The liquid can be pumped out of the hydrogen generator 14 through an outlet valve 40 and back into the hydrogen generator 14 through an inlet 20. The liquid can be a reactant-containing liquid received via liquid outlet passage 18 for producing hydrogen within the hydrogen generator 14. Outlet valve 40 may be controlled to select the quantity of reactant-containing liquid pumped into the hydrogen generator 14 at a given time.

The fuel cell system 10 can include an optional control system for controlling the operation of the hydrogen generator 14 and/or the fuel cell stack 12. Components of the control system can be disposed in the hydrogen generator 14, the fuel cell stack 12, the apparatus powered by the fuel cell system, or a combination thereof. The control system can include a controller 30. Although the controller 30 can be located within the fuel cell system 10 as shown, it can be located elsewhere in the fuel cell system 10 or within the electric device for example. The controller 30 can communicate through a communication line 32 with the pump 22, through a communication line 34 with the fuel cell stack 12, through a communication line 36 with the hydrogen generator 14 and valve 40, and through a communication line 38 with the electric device. Sensors for monitoring voltage, current, temperature, pressure and other parameters can be disposed in or in communication with those components so gas generation can be controlled based on those parameters.

The hydrogen generator 14 has a liquid delivery member, according to one embodiment, which is described below with reference to FIGS. 2-4. The hydrogen generator 14 includes a reactant storage area 58, a reaction area 52 and an effluent storage area 74 within a container 50. The liquid 60 is contained within the reactant storage area 58, and the solid 54 is contained within the reaction area 52. The liquid 60 includes a first reactant, such as a water and acid solution that can be transported to the reaction area 52. The solid 54 includes a second reactant, such as a chemical hydride, and can be in the form of one or more pellets. The effluent storage area 74 includes a filter, which can have one or more filter components, such as three filter components 76, 78 and 80. The reactant storage area 58 is enclosed by an enclosure 59 such as a liquid impermeable bag.

The reaction area 52 can be at least partially enclosed by an enclosure 56. The effluent storage area 74 can be enclosed by an optional enclosure (not shown). Various types of enclosures can be used for the reactant storage area 58, the reaction area 52 and the effluent storage area 74. For example, an enclosure can include internal surfaces of the container 50, other internal components of the hydrogen generator 14 and/or it can share a common wall or section with one or more other enclosures. All or portions of the enclosures can be flexible, rigid, stationary or moveable, preferably as long as the effluent storage area 74 is in a volume exchanging relationship with at least one of the reactant storage area 58 and the reaction area 52. As shown, the enclosures 59 and 56 enclosing the reactant storage area 58 and the reaction area 52, respectively, are flexible enclosures that can collapse as liquid 60 exits the reactant storage area 58, and effluent exits the reaction area 52. Examples of flexible enclosures include bags, balloons and bellows. It can be advantageous for flexible enclosures to be elastic so they can be stretched when full and tend to contract back to their original size as the contents exit, thereby helping to expel fluids as the hydrogen generator 14 is operated.

During use of the hydrogen generator 14, liquid 60 is transported from the reactant storage area 58 to the reaction area 52 by any suitable means, as described above. For example, the liquid 60 can be transported through a liquid outlet passage 18. If a pump is used, the pump 22 can be within the container 50, or it can be located externally as in the embodiment shown in FIG. 1. When a pump 22 is used, the liquid 60 can be pumped through the liquid outlet passage 18, such as a liquid outlet connection to the pump. Optional features, such as valves, filters and the like can be incorporated into the liquid outlet connection 18. An external pump 22 can pump the liquid 60 back into the hydrogen generator 14 through a liquid inlet connection 20.

The hydrogen generator 14 includes a liquid delivery member 64 for transporting and dispersing the liquid 60 to the solid 54 within the reaction area 52. The liquid delivery member 64 is connected to tube 92 in liquid communication with inlet 20 such that the liquid 60 from the first reactant storage area 58 is delivered to the reaction area 52. The liquid delivery member 64 includes a first flexible portion 72 and a second liquid distribution portion 75 containing a plurality of openings 90 for delivering the liquid 60 to the reaction area 52. The flexible portion 72 is more flexible than the liquid distribution portion 75. One or more openings 90 may be employed to deliver the liquid 60 to the solid 54 to generate hydrogen. In the embodiment shown, the openings 90 are spaced throughout a length of the tubular second portion sufficient to deliver a sufficient amount of liquid 60 over a sufficient area of the solid 54.

Figure 2:
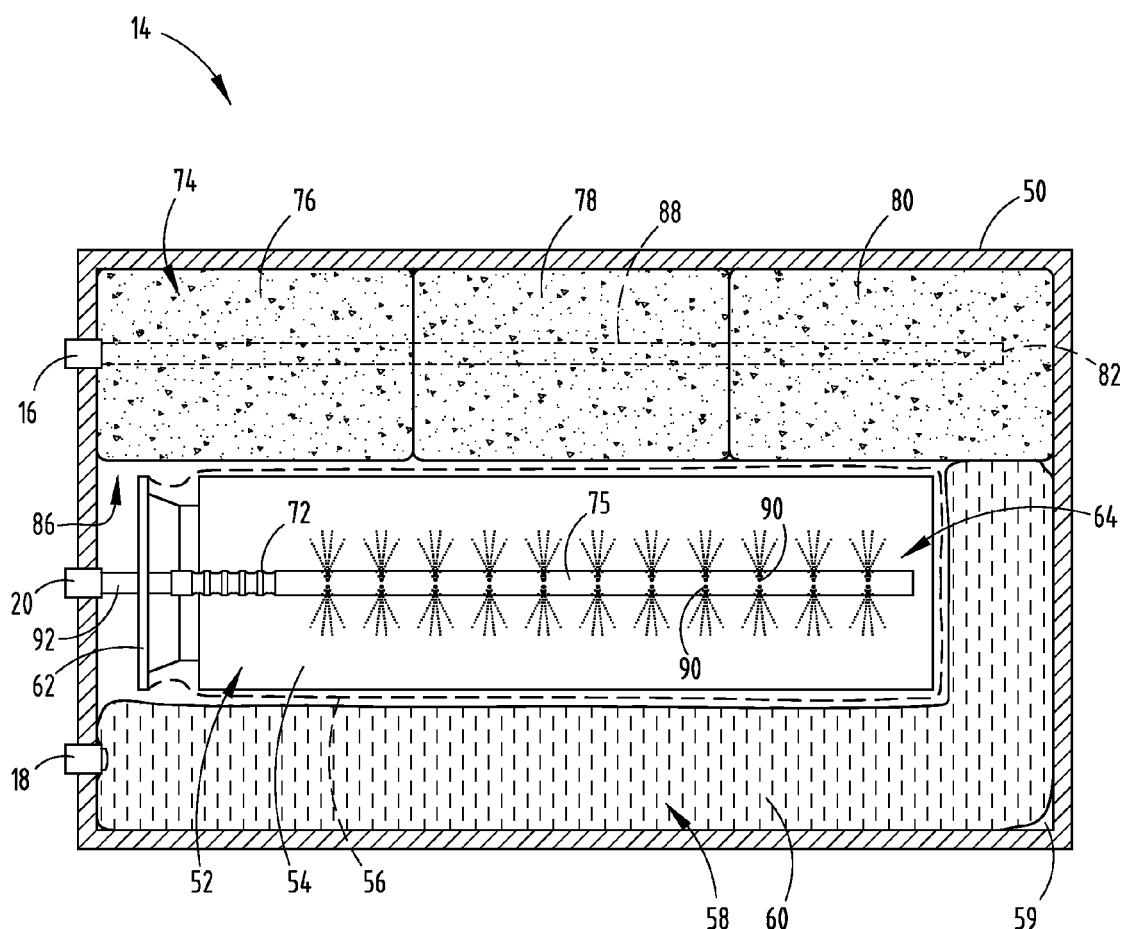
FIG. 2 is a cross-sectional view of the hydrogen generator illustrating the liquid delivery member extending into a reaction area, according to a first embodiment.
Figure 3:
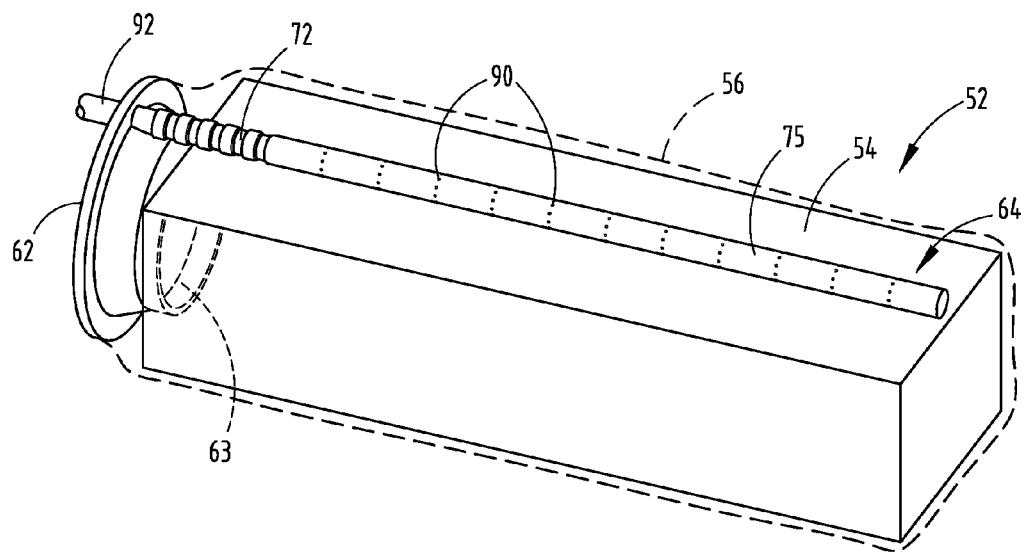
FIG. 3 is a perspective view of the reaction area containing the liquid delivery member of FIG. 2 in relation to an unconsumed solid reactant pellet.
Figure 4:
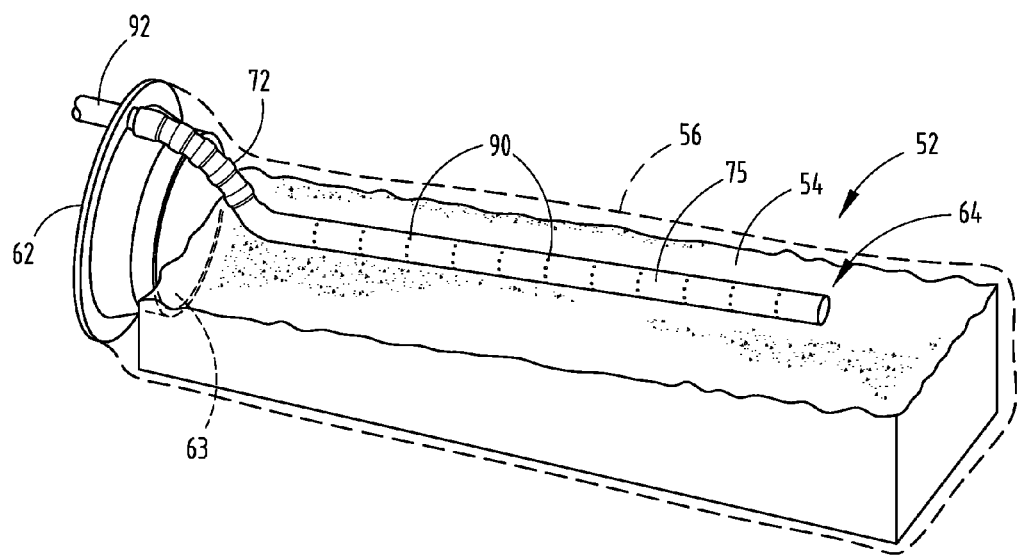
FIG. 4 is a perspective view of the reaction area illustrating the solid reactant pellet partially consumed and the liquid delivery member flexed on top thereof.

The reaction area 52 is shown in FIGS. 3 and 4 having an enclosure 56 surrounding the solid 54 and the liquid delivery member 64. The enclosure 56 may include a polymeric bag or other liquid impermeable container that contains the solid 54 and its reaction with the liquid 60 delivered thereto. An exhaust nozzle or port 62 is matingly engaged to the open end of the enclosure 56 and has an opening 63 for allowing hydrogen and effluent to exit the enclosure 56. The liquid delivery member 64 is shown integrally connected to the exhaust nozzle 62, according to one embodiment. This advantageously allows for the exhaust nozzle 62 to be assembled to the enclosure 56 within a single opening, thereby minimizing the assembly thereof. The liquid 60 can flow to the reaction area 52 through a liquid inlet passage, such as a tube connected to the inlet connection 20. Optional features such as valves, filters and the like can be incorporated into the liquid inlet connection 20. The liquid 60 is delivered though the liquid delivery member 64 to disperse the liquid 60 over a large portion of the reaction area 52. The liquid delivery member 64 can include one or more structures that extend into the reaction area 52. The structures can be substantially linear, as shown in FIGS. 2 and 3, or they can have other shapes.

The liquid delivery member 64 is shown in FIGS. 3 and 4 disposed on top of the solid 54 such that the liquid delivery member 64 contacts or is in close proximity to the solid 54. In FIG. 3, the solid 54 is shown not consumed and the liquid delivery member 64 lies on top of the solid 54 and has a substantially straight arrangement that is not flexed. As liquid 60 is transported through the liquid delivery member 64, the liquid exits openings 90 and is applied due to liquid flow and gravity and reacts with the second reactant in the solid 54 so as to consume the solid 54 while generating hydrogen. As the second reactant is consumed, the solid 54 dissipates such that its shape and size changes and becomes smaller. Hydrogen gas generated in the reaction area 52 exits through the exhaust nozzle 62 and tends to carry with it reaction byproducts as well as some of the unconsumed reactants. In addition, the flow of liquid tends to be greater through the openings 90 at the inlet end rather than the outlet end of the liquid distribution portion 75, particularly when openings 90 have a uniform size. Both of these factors result in more of the liquid 60 on the side of the reaction area 52 closest to the exhaust nozzle 62, such that the solid closest to the exhaust nozzle 62 is consumed at a greater rate. The liquid delivery member 64 advantageously employs a flexible portion 72 such as a flexing neck that allows the liquid delivery member 64 to change shape and maintain a position disposed on top of the partially consumed solid 54 as shown in FIG. 4. In this example, the flexible portion 72 allows the liquid distribution portion 75 to move and remain on top of and in better contact with the partially consumed solid 54, which allows for efficient and effective liquid transport and reaction of the first and second reactants. In the embodiment shown, the flexible portion 72 may include a ripple having alternating variations in diameter that allows the tubular shaped member to flex and bend. While the plurality of openings 90 are shown evenly disposed throughout the liquid distribution portion 75 of the liquid delivery member 64, it should be appreciated that the openings 90 may be disposed unevenly throughout the liquid distribution portion 75, according to other embodiments.

Figure 5:
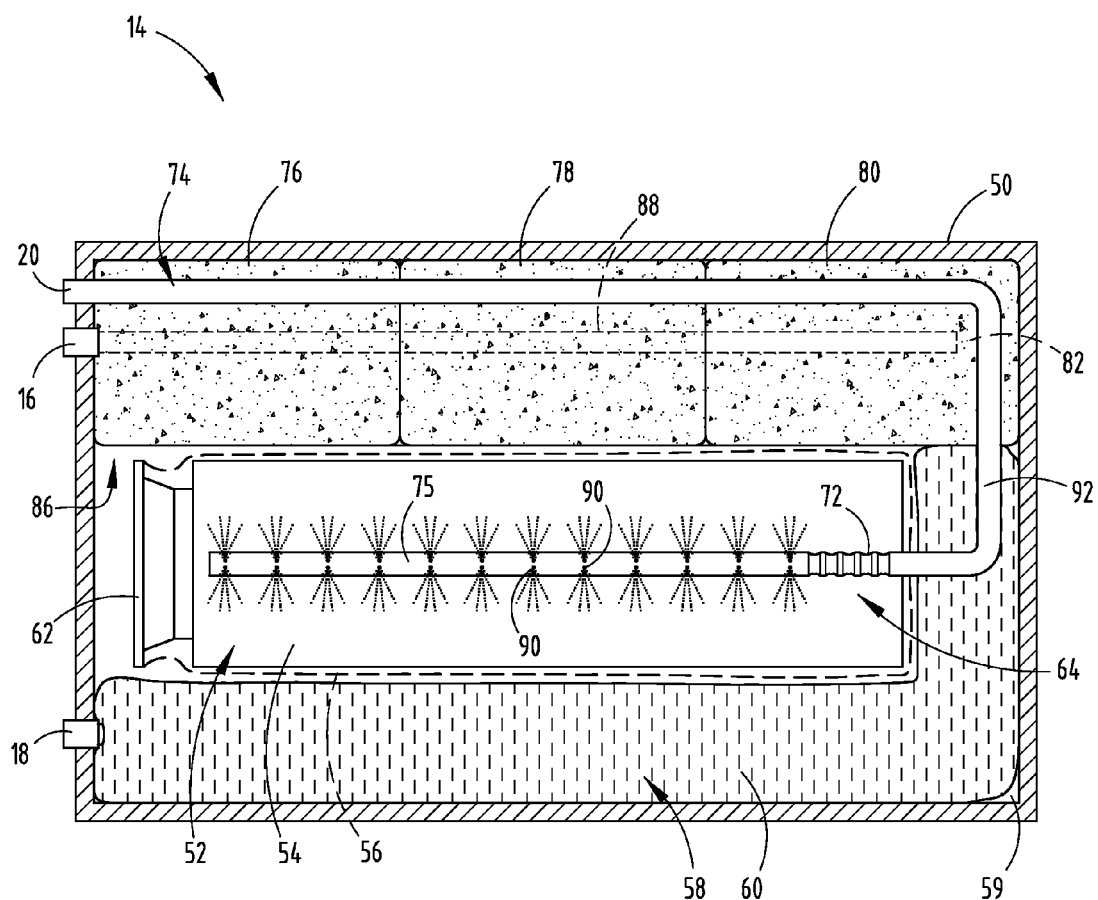
FIG. 5 is a cross-sectional view of a hydrogen generator having a liquid delivery member, according to another embodiment.
Figure 6:
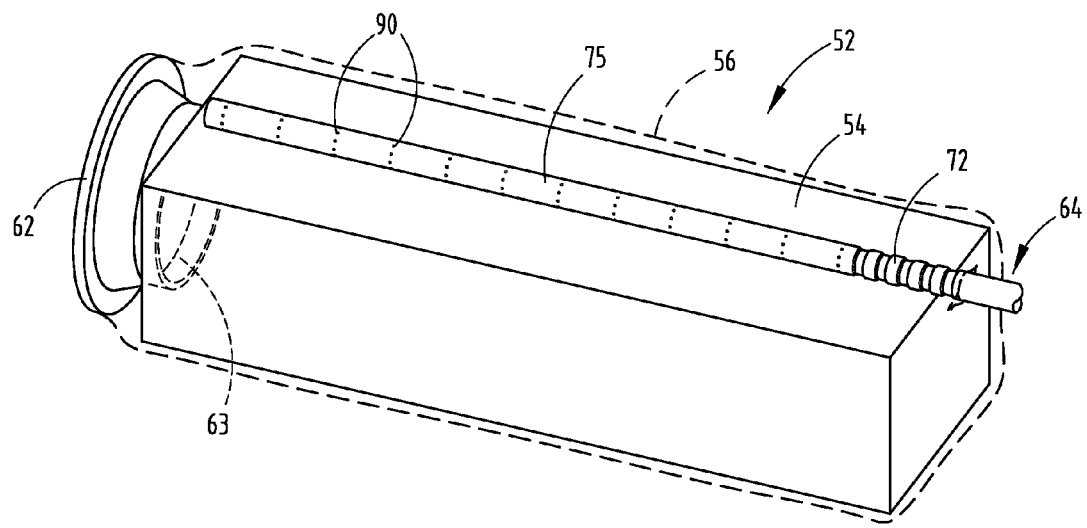
FIG. 6 is a perspective view of the reaction area of FIG. 5 illustrating the liquid delivery member on top of an unconsumed solid reactant pellet.
Figure 7:
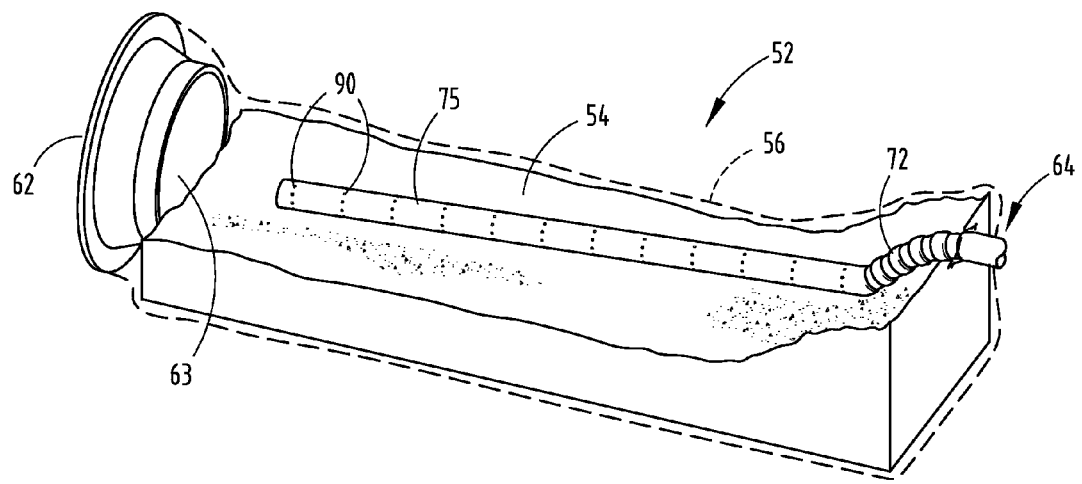
FIG. 7 is a perspective view of the reaction area of FIG. 5 with the solid reactant pellet partially consumed and the liquid delivery member disposed thereon.
Figure 8:
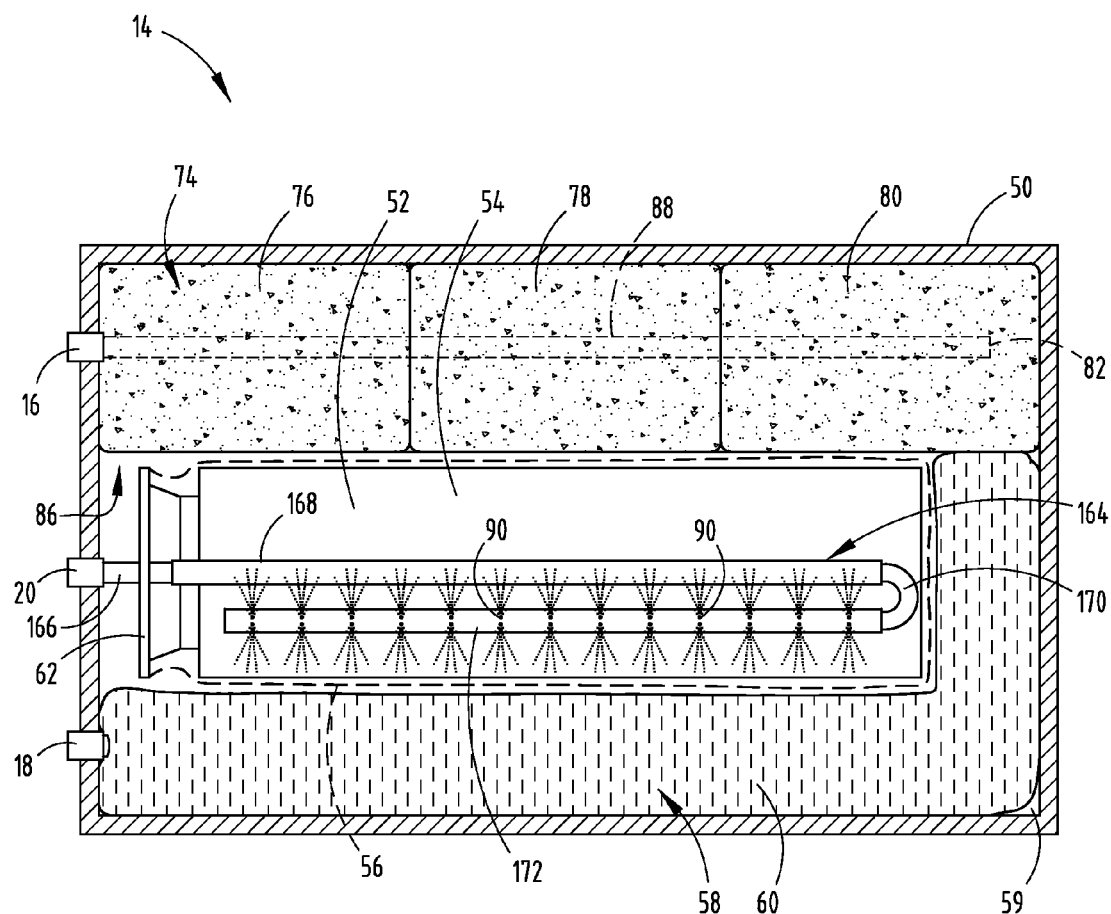
FIG. 8 is a cross-sectional view of a hydrogen generator having a liquid delivery member, according to a further embodiment.
Figure 9:
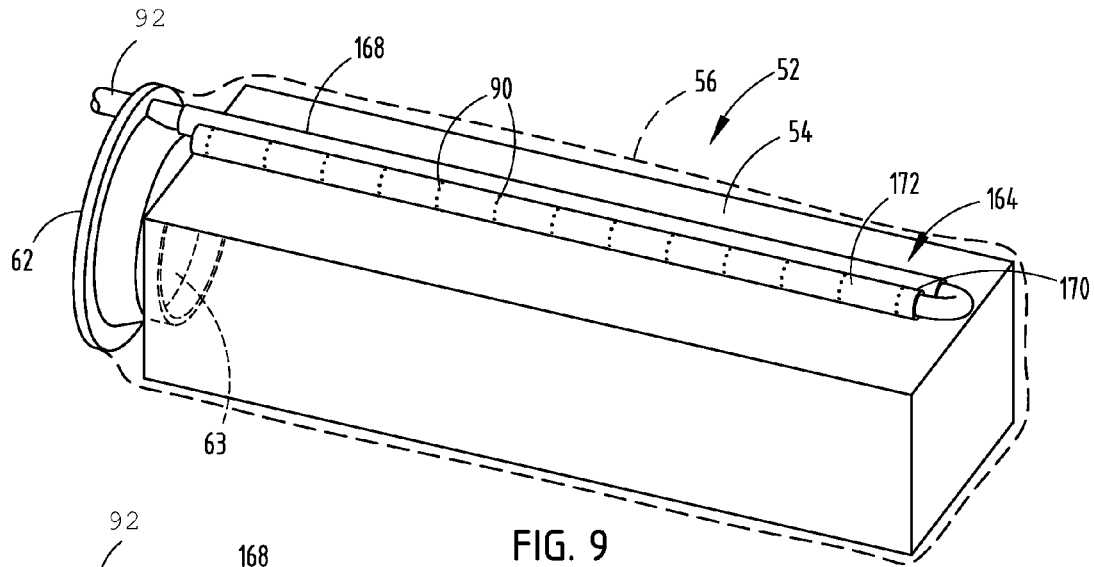
FIG. 9 is a perspective view of the reaction area illustrating the liquid delivery member of FIG. 8 on top of an unconsumed solid reactant pellet.

Referring to FIGS. 5-7, a hydrogen generator 14 is illustrated employing a liquid delivery member 64 that is separate from the exhaust nozzle 62, according to another embodiment. In this embodiment, the liquid delivery member 64 includes a tubular first portion 92 in fluid communication with liquid inlet 20, a flexible second portion 72, and a liquid distribution third portion 75. The first portion 92 enters the reaction area 52 at an end opposite the exhaust nozzle 62. The second portion 72 is adjacent to the first portion and is sufficiently flexible to bend and thereby allow the liquid delivery member 64 to flex and bend so as to maintain the position of the third portion 75 on top of or in close proximity to the solid 54, both when the solid and its second reactant 54 is not consumed as shown in FIG. 6 and when the solid 54 is partially consumed as shown in FIG. 7. The third portion 75 has a plurality of openings 90 for allowing liquid to flow through to be applied to the second reactant in the solid 54.

In this embodiment, the liquid distribution portion 75 delivers liquid 60 entering the reaction area 52 from the side opposite of the exhaust nozzle 62 to the solid 54. The flow of liquid 60 tends to be greater through the openings 90 at the inlet end as opposed to the outlet end of the liquid distribution portion 75 when equal size openings 90 are employed, such that a greater quantity of liquid 60 is transported to the solid 54 at the end opposite the exhaust nozzle 62. This may partially offset the effect of exiting hydrogen gas in causing a higher rate of consumption of the solid 54 near the exhaust nozzle 62.

Figure 10:
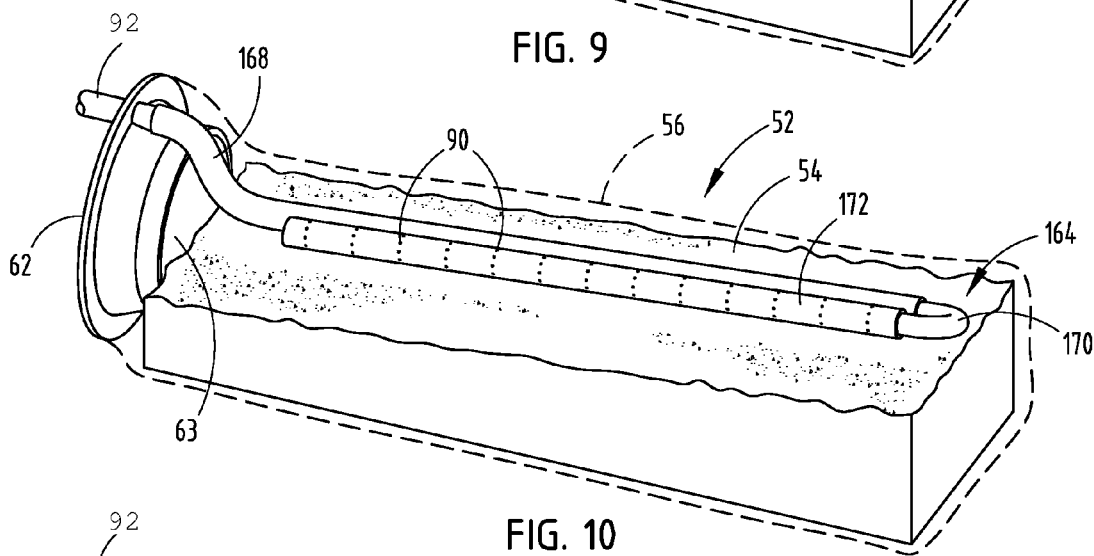
FIG. 10 is a perspective view of the reaction area of FIG. 8 with a partially consumed solid reactant pellet and the liquid delivery member disposed thereon.
Figure 11:
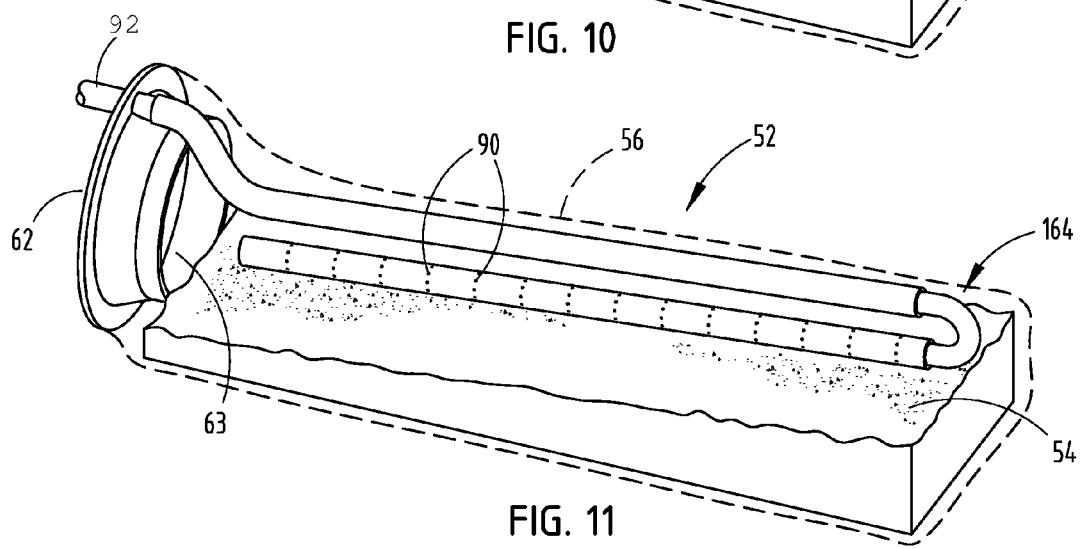
FIG. 11 is a perspective view of a reaction area illustrating a liquid delivery member disposed on a partially consumed solid reactant pellet, according to a further embodiment.

Referring to FIGS. 8-11, a hydrogen generator 14 is illustrated employing a liquid delivery member 164 that is assembled to the exhaust nozzle 62 and has an outer terminal end that extends back towards the exhaust nozzle 62, according to a further embodiment. In this embodiment, the liquid delivery member 164 has a first tube delivery portion 168 in fluid communication with the liquid inlet 20 via an integral assembly with the exhaust nozzle 62, a second liquid distribution portion 172 having a plurality of openings 90 for allowing the liquid to exit and contact the solid second reactant composition 54, and a U-shaped connector 170 connecting the first and second portions 168 and 172. At least one of the first portion 168 and the U-shaped connector 170 is flexible to allow the second portion 172 to be in contact or close proximity to the solid second reactant 54 as the solid reactant 54 is consumed as shown in FIGS. 10 and 11, so the liquid delivery member 164 has a flexible portion including the first portion 168, the connector 170 or both the first portion 168 and the connector 170.

The first portion 168 may be flexible as shown in FIGS. 10 and 11, such that the tube can bend to conform to the shape of the top surface of the solid 54. This allows the second portion 172 with openings 90 to lay on top of the solid 54 and effectively and efficiently deliver liquid 60 to the solid 54. In the embodiment shown in FIG. 10, the first portion 168 flexes to allow the second portion 172 to move. In the embodiment shown in FIG. 11, the first portion 168 flexes downward and also rotates about its longitudinal axis to allow the second portion 172 to drop below the first portion 168. In some embodiments, the U-shape connector 170 may be rigid or semi-rigid to prevent kinking. By employing a liquid delivery member 64 that extends back towards the inlet side, the liquid delivery member 64 can be integrally assembled with the exhaust nozzle 62 to minimize the number of openings in the enclosure 56, and enhanced liquid delivery can be achieved at a location away from the exhaust nozzle 62.

When an internal or external pump 22 as shown in FIG. 1 is used, it can be powered at least initially by an external power source, such as the fuel cell or another battery within a fuel cell system or an electrical appliance or device. If the pump 22 is within the container 50, connection can be made to an external power source through electrical contacts. Alternatively, a battery can be located within the container to at least start the pump 22.

The solid 54 contains a second reactant that will react with the first reactant in the reactant area 52. The solid 54 can be in a convenient form such as a pellet containing the second reactant and any desired additives. An optional catalyst can be included in or downstream from the reaction area. For example, the catalyst can be on or part of the reaction area enclosure 56, dispersed in the solid 54, or carried into the reaction area as part of the liquid 60.

Referring to FIG. 2, as the liquid 60 comes in contact with the solid 54, the first and second reactants react to produce hydrogen gas and byproducts. The hydrogen gas flows out of the reaction area 52 and through an opening 63 to an effluent entryway 86, where it enters the effluent storage area 74. The hydrogen gas carries with it effluent that includes byproducts as well as unreacted reactants and other constituents of the solid 54 and liquid 60. Where a reaction area enclosure 56 is used, the effluent exits the reaction area 52 though an opening 63 in the enclosure 56. The opening 63 in the reaction area enclosure 56 can include an exhaust nozzle 62, which can help keep the aperture open. The exhaust nozzle 62 can optionally include a screen to hold large pieces of the solid 54 in the reaction area 52 to improve utilization of the second reactant. The effluent passageway can be a structure such as a tube (not shown) extending between the exhaust nozzle 62 and the effluent entryway 86, or it can be spaces that are present or develop between the exhaust nozzle 62 and the effluent entry 86. Although it is desirable for the majority of the reactants to react within the reaction area 52, unreacted reactants in the effluent can continue to react after exiting the reaction area 52. An optional secondary reaction area (not shown) can be included between the primary reaction area 52 and the effluent storage area 74. Liquid 60 can be transported directly to this secondary reaction area, such as through a second fluid passage (not shown), to react with unreacted second reactant in the effluent from the primary reaction area 52. A catalyst can be disposed within the secondary reaction area.

Hydrogen gas and effluent entering a proximal portion of the effluent storage area 74 through the effluent entryway 86 flows through the filter 76, 78 and 80 toward a distal portion of the effluent storage area 74. As the hydrogen gas and effluent flow through the filter 76, 78 and 80, hydrogen gas is separated from solid particles of the effluent by the filter 76, 78 and 80, which can be a single filter component or multiple filter components, such as the three filter components 76, 78 and 80. As described above, the filter 76, 78 and 80 can have portions and/or filter components of different porosities, preferably increasing in porosity from the proximal portion toward the distal portion of the effluent storage area 74, where the hydrogen gas exits the effluent storage area 74.

The hydrogen gas may be separated from liquids and any remaining solids in the effluent before exiting the hydrogen generator 14 by a hydrogen permeable, liquid impermeable material. The hydrogen gas can exit the hydrogen generator 14 through a hydrogen outlet connection 16. The hydrogen outlet connection 16 can be located near the distal portion of the effluent storage area 74 as shown in FIG. 2, or it can be located elsewhere, such as near the proximal portion of the effluent storage area 74. If the hydrogen outlet connection 16 is not near the distal portion of the effluent storage area 74, the hydrogen gas can flow from the distal portion of the effluent storage area 74 to the hydrogen outlet connection 16 through a hydrogen outlet passage 88, such as a tube, which has a proximal end near the hydrogen outlet connection and a distal end 82 near the distal portion of the effluent storage area 74. The hydrogen gas can enter the hydrogen outlet passage 88 through the distal end 82. The hydrogen permeable, liquid impermeable material can be a component, such as a membrane, plug or filter element, preferably located at or near the distal end 82, or at least a portion of the hydrogen passage 88 can be made of a material that has high hydrogen permeability and low or no liquid permeability. If only a portion of the hydrogen passage 88 is made from a material with high hydrogen, low liquid permeability, that portion is preferably a distal portion to minimize the amount of solids in the effluent that comes in contact with and could clog the material, preventing hydrogen gas from exiting the effluent storage area 74.

If the hydrogen outlet connection 16 is located near the distal portion of the effluent storage area 74, the hydrogen generator 14 can include an optional compartment positioned between the hydrogen outlet connection 16 and the hydrogen permeable, liquid impermeable material. Alternatively, at least a portion of an effluent storage area enclosure (e.g., a flexible bag) near the distal portion of the effluent storage area 74 can be the hydrogen permeable and liquid impermeable material.

As shown, the effluent storage area 74 can be in a volume exchanging relationship with both the reactant storage area 58 and the reaction area 52. As the hydrogen generator 14 is used, reactant composition is transported from the first reactant storage area 58, which becomes smaller, to the reactant area 52, where first and second reactants are consumed as they react to produce hydrogen and byproducts. The hydrogen gas and effluents exit the reaction area 52, which becomes smaller, and enter the effluent storage area 74, which is able to become larger by gaining at least a portion of the quantity of volume lost by the reactant storage area 58 and the reaction area 52. As the effluent storage area 74 becomes larger, the filter or at least one filter component 76, 78 and 80 expands to partially or completely fill the enlarged volume and accommodate the hydrogen gas and effluent. The relative sizes, shapes and locations of the areas 52, 58 and 74 can be varied as described above, as can passageways, connections and the like, as long as the effluent storage area 74 is in a volume exchanging relationship with at least one and preferably all of the reactant storage area 58, and the reaction area 52, and the filter 76, 78 and 80 is initially compressed and expands during operation of the hydrogen generator as the volume of the effluent storage area 74 increases. The locations of other components, such as filter components, fluid connections, passageways, dispersing members, nozzles and the like can also be varied, whether the areas 52, 58, 74 are in the arrangement shown or in another arrangement.

The hydrogen generator 14 can include an optional moveable partition (not shown), between the effluent storage area 74 and adjacent portions of the reactant storage area 58 and the reaction area 52, with the moveable partition able to move toward the reactant storage area 58 and the reaction area 52 as those areas 52 and 58 become smaller and the effluent storage area 74 becomes larger during operation of the hydrogen generator 14, as long as there is an effluent entryway 86 through which effluent can pass into the effluent storage area 74. Such a moveable partition can be used to facilitate compression of the filter components during assembly of the hydrogen generator 14. The hydrogen generator 14 can include other components not shown, as described above.

A variety of materials are suitable for use in a hydrogen generator, including those disclosed above. Materials selected should be resistant to attack by other components with which they may come in contact (such as reactant compositions, catalysts, effluent materials and hydrogen gas) as well as materials from the external environment. The materials and their important properties should also be stable over the expected temperature ranges during storage and use, and over the expected lifetime of the hydrogen generator.

Suitable materials for the housing and internal partitions can include metals, plastics, composites and others. Preferably the material is a rigid material that is able to tolerate expected internal pressures, such as a polycarbonate or a metal such as stainless steel or anodized aluminum. The housing can be a multi-component housing that is closed and sealed to securely hold the components of the hydrogen generator and prevent hydrogen gas from leaking therefrom. Various methods of closing and sealing can be used, including fasteners such as screws, rivets, etc., adhesives, hot melts, ultrasonic bonding, and combinations thereof.

Suitable materials for flexible enclosures can include polypropylene, polyethylene, polyethylene terephthalate and laminates with a layer of metal such as aluminum. If an elastic enclosure is desired, suitable materials include silicone and rubbers.

Suitable materials for tubing, etc., used to transport fluid reactant composition and effluents can include silicone, TYGON® and polytetrafluoroethylene.

Suitable materials for filters and filter components can include foam materials. A foam material can have an open cell structure (an open cell foam) or closed cell structure (a closed cell foam). Generally a major part of the foam filter will have an open cell structure. In some embodiments the filter component or a portion thereof can have a closed cell structure or a skin on one or more surfaces, depending on the desired porosity and permeability to solids, liquids and gases. The filter components can be made from elastomeric foams, preferable with a quick recovery (low compression set/high recovery). The elastomer may be a resilient cured, cross-linked or vulcanized elastomer, for example. Examples of suitable elastomeric materials include one or more of: a polyurethane elastomer, a polyethylene, a polychloroprene (neoprene), a polybutadiene, a chloroisobutylene isoprene, a chlorosulphonated polyethylene, an epichlorohydrin, an ethylene propylene, an ethylene propylene diene monomer, an ethylene vinyl acetate, a hydrogenated nitrile butadiene, a polyisoprene, an isoprene, an isoprene butylene, a butadiene acrylonitrile, a styrene butadiene, a fluoroelastomer, a silicone, and derivatives and combinations thereof.

Other materials that can be used for the filter components include reticulated materials such as reticulated polyesters (e.g., polyethylene terephthalate), polyethylene, polyurethane, polyimide, melamine, nylon, fiberglass, polyester wool and acrylic yarn. As disclosed above, the filter does not necessarily have to be made of a material that can expand by itself after being compressed if another means of expanding the filter is provided.

Suitable materials for a liquid delivery or dispersing member can include a liquid impermeable material, such as tubular or other hollow components made from materials such as silicone rubber, TYGON® and polytetrafluoroethylene, polyvinylidene fluoride (PVDF) and fluorinated ethylene-propylene (FEP), with holes or slits formed therein; a liquid permeable member made from a material such as cotton, a nylon, an acrylic, a polyester, ePTFE, or a fritted glass that can allow the fluid reactant composition to pass through or that can wick the liquid reactant composition; or a combination, such as a hollow liquid impermeable material with holes or slits therein and wrapped in, surrounded by or coated with a material that can wick the liquid reactant composition.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising:
a container;
a first reactant storage area configured to contain a liquid comprising a first reactant;
a reaction area within the container;
a solid comprising a second reactant within the reaction area;
a hydrogen outlet; and
a liquid delivery member extending into the reaction area and configured to deliver the liquid from the first reactant storage area to the reaction area, wherein the liquid delivery member comprises a liquid distribution portion and a flexible portion, more flexible than the liquid distribution portion, that flexes to allow the liquid distribution portion to move with the solid as the second reactant is consumed; wherein the liquid delivery member extends from an exhaust nozzle that is in communication with the hydrogen outlet; and, wherein the liquid delivery member comprises a first tube delivery portion coupled to a liquid inlet port, a second liquid distribution portion, and a U-shaped connector connecting the first and second portions, wherein at least one of the first portion and the U-shaped connector is flexible.

2. The hydrogen generator of claim 1, wherein the liquid delivery member has the flexible portion between opposite ends thereof.

3. The hydrogen generator of claim 1, wherein the liquid delivery member comprises a plurality of openings for delivering the liquid reactant to the reaction area.

4. The hydrogen generator of claim 1, wherein the solid comprises a pellet containing the second reactant.

5. The hydrogen generator of claim 1, wherein the first reactant storage area is located in the container.

6. The hydrogen generator of claim 1, wherein the second reactant is contained in the reaction area within a flexible enclosure, wherein the liquid delivery member extends through an opening in the flexible enclosure.

7. A liquid delivery member for delivering a liquid containing a first reactant to a hydrogen generator, said liquid delivery nozzle comprising:
   an inlet for receiving a liquid containing a first reactant;
   an outlet for delivering the liquid to a solid containing a second reactant within a reaction area; and
   a flexible portion, more flexible than the outlet, provided between the inlet and outlet, wherein the flexible portion flexes such that the outlet can move with the solid as the second reactant is consumed.

8. The liquid delivery member of claim 7, wherein the liquid delivery member extends from an exhaust nozzle that is in communication with a hydrogen outlet that allows hydrogen to exit the hydrogen generator.

9. The liquid delivery member of claim 7 further comprising a liquid distribution portion between the inlet and outlet, wherein the flexible portion is provided between the liquid distribution portion and the inlet.

10. The liquid delivery member of claim 7, wherein the liquid delivery member comprises a first tube delivery portion configured to be coupled to a liquid inlet port, a second liquid distribution portion and a U-shaped connector connecting the first and second portions, wherein at least one of the first portion and the U-shaped connector is the flexible portion.

11. The liquid delivery member of claim 7, wherein the outlet comprises a plurality of openings for delivering the liquid to the second reactant.

12. The liquid delivery member of claim 7, wherein the solid containing the second reactant comprises a pellet.

13. The liquid delivery member of claim 7, wherein the inlet receives liquid from a first reactant storage area located within a container of the hydrogen generator.

14. The liquid delivery member of claim 7, wherein the liquid delivery member is located within a flexible enclosure, and wherein the second reactant is contained in the reaction area within the flexible enclosure, and wherein the flexible liquid delivery member extends through an opening in the flexible enclosure.

* * * * *